(12) United States Patent
Inoko et al.

(10) Patent No.: US 9,851,631 B2
(45) Date of Patent: Dec. 26, 2017

(54) LIGHT SOURCE OPTICAL SYSTEM AND PROJECTION DISPLAY APPARATUS EMPLOYING THE SAME

(71) Applicant: CANON KABUSHIKI KAISHA, Tokyo (JP)

(72) Inventors: Kazuhiro Inoko, Utsunomiya (JP); Takehito Kawasumi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/365,614

(22) Filed: Nov. 30, 2016

(65) Prior Publication Data

US 2017/0168380 A1    Jun. 15, 2017

(30) Foreign Application Priority Data

Dec. 10, 2015 (JP) .................................. 2015-241386
Nov. 4, 2016 (JP) .................................. 2016-216118

(51) Int. Cl.

| G03B 21/20 | (2006.01) |
|---|---|
| H04N 9/31 | (2006.01) |
| G02B 27/14 | (2006.01) |
| G02B 13/16 | (2006.01) |
| G02B 3/00 | (2006.01) |
| G02B 3/06 | (2006.01) |
| G02B 19/00 | (2006.01) |
| G03B 21/00 | (2006.01) |

(52) U.S. Cl.
CPC ......... G03B 21/208 (2013.01); G02B 3/0062 (2013.01); G02B 3/06 (2013.01); G02B 13/16 (2013.01); G02B 19/0047 (2013.01); G02B 27/141 (2013.01); G03B 21/005 (2013.01); G03B 21/204 (2013.01); G03B 21/2013 (2013.01); H04N 9/3152 (2013.01)

(58) Field of Classification Search
CPC ............... G03B 21/208; G03B 21/204; G03B 21/2013; G03B 21/2033; G02B 3/0062; G02B 3/06; G02B 13/16; G02B 3/0056; H04N 9/3152; H04N 9/3164; H04N 9/3161; H04N 9/3158
USPC ................... 353/38; 362/268, 331
See application file for complete search history.

(56) References Cited

U.S. PATENT DOCUMENTS

| 9,223,122 B2 | 12/2015 | Inoko | |
|---|---|---|---|
| 2012/0133904 A1 | 5/2012 | Akiyama | |
| 2014/0139810 A1* | 5/2014 | Matsubara | G03B 21/2013 353/31 |
| 2016/0091782 A1* | 3/2016 | Hashizume | G03B 21/208 353/84 |

FOREIGN PATENT DOCUMENTS

| JP | 2000-214528 A | 8/2000 |
|---|---|---|
| JP | 2013-114980 A | 6/2013 |

* cited by examiner

*Primary Examiner* — Ryan Howard
(74) *Attorney, Agent, or Firm* — Canon USA Inc., IP Division

(57) ABSTRACT

A light source optical system includes a first fly-eye lens including a plurality of first lens cells, and a second fly-eye lens including a plurality of second lens cells that guide a light flux from the first fly-eye lens to a fluorescent member. A light source image is formed between the first fly-eye lens and the fluorescent member. When a short side direction of the second lens cells is defined as a first direction and a long side direction of the second lens cells is defined as a second direction, the width of the light source image in the second direction is wider than the width of the light source image in the first direction.

16 Claims, 12 Drawing Sheets

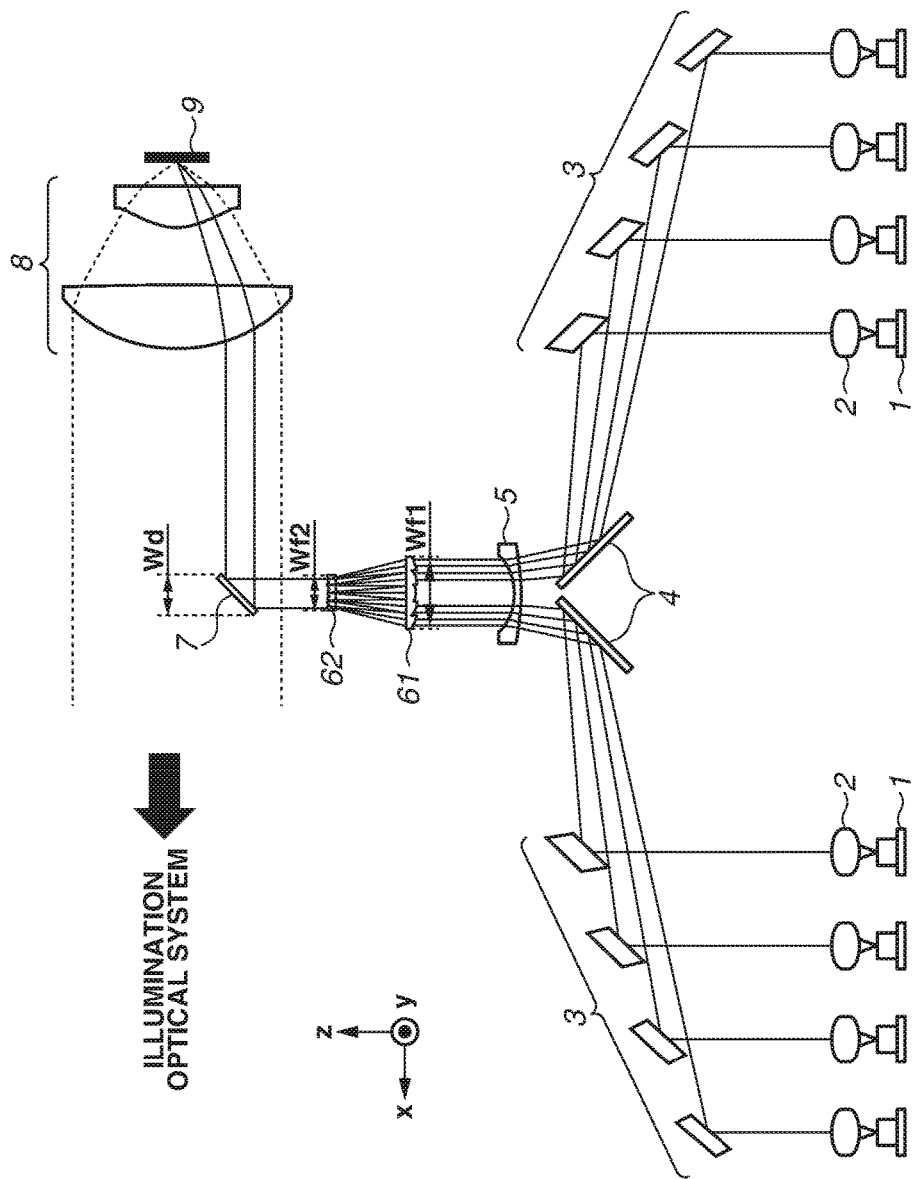

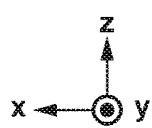
FIG.2A
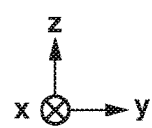
FIG.2B
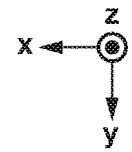
FIG.2C
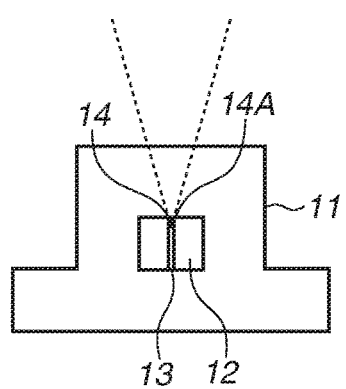
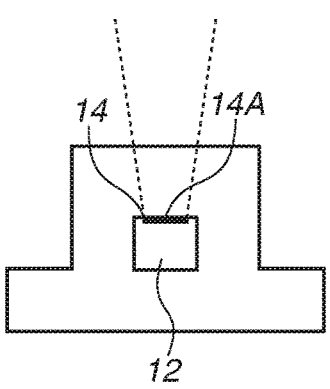
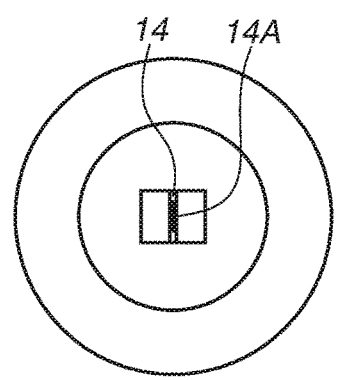

FIG.3A
FIG.3B
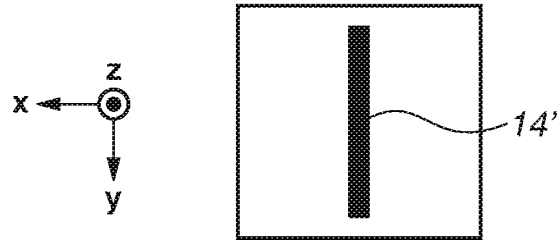
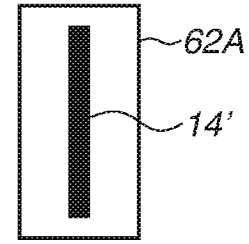

LIGHT SOURCE OPTICAL SYSTEM AND PROJECTION DISPLAY APPARATUS EMPLOYING THE SAME

BACKGROUND OF THE INVENTION

Field of Invention

The present invention relates to a light source optical system and a projection display apparatus employing the same.

Description of Related Art

In recent years, a projector has been developed that irradiates a fluorescent member with light flux emitted from a high-output laser diode (hereinafter, referred to as "LD") as excitation light, and uses fluorescent light having a converted wavelength as source light. The brightness of such a projector can be increased by increasing the number of LDs or increasing the output intensity of a single LD.

However, when the intensity of light incident on the fluorescent member is increased, the optical density of a condensed light spot on a surface of the fluorescent member becomes excessively high, and this may lead to a decrease in light conversion efficiency.

United States Patent Application Publication No. 2012/0133904 discusses an arrangement in which two fly-eye lenses are provided next to an optical system configured to compress light fluxes from a plurality of LDs to uniform the optical density of a condensed light spot formed on the fluorescent member.

United States Patent Application Publication No. 2012/0133904 does not address an influence of variation that each LD has. More specifically, the parallelism of output light of an LD may vary depending on the LD. Therefore, a light source image formed near a second fly-eye lens in the arrangement discussed in United States Patent Application Publication No. 2012/0133904 may extend from a predetermined lens cell of the second fly-eye lens and enter an adjacent lens cell. As a result, the vignetting amount of light eclipsed by the optical element in the subsequent stage may increase and thereby negatively affect light use efficiency.

Further, it is not desirable to excessively increase the size of a lens cell with respect to a light source image to prevent the light source image from extending to an adjacent lens cell because this leads to an increase in overall size of the optical system.

SUMMARY OF THE INVENTION

The present patent application is directed to a light source optical system capable of preventing a decrease in light use efficiency while maintaining an appropriate overall size of the system. A projection display apparatus employing the light source optical system is also disclosed.

According to an aspect of the present invention, a light source optical system configured to guide a light flux from a light source to a wavelength converting element includes a first lens surface array including a plurality of first lens surfaces, and a second lens surface array including a plurality of second lens surfaces and configured to guide light fluxes from the first lens surface array to the wavelength converting element. A light source image is formed between the first lens surface array and the wavelength converting element by the light flux transmitted through the plurality of first lens surfaces, wherein, when a short side direction of the plurality of second lens surfaces is defined as a first direction and a long side direction of the plurality of second lens surfaces is defined as a second direction, a width of a light source image in the second direction is wider than a width of the light source image in the first direction.

Further features of the present invention will become apparent from the following description of exemplary embodiments with reference to the attached drawings.

BRIEF DESCRIPTION OF THE DRAWINGS

FIG. 1 illustrates a configuration of a light source apparatus according to a first exemplary embodiment of the present invention.

FIGS. 2A, 2B, and 2C each schematically illustrate a laser diode.

FIGS. 3A and 3B each illustrate a relationship between a second fly-eye lens and a light source image.

DESCRIPTION OF THE EMBODIMENTS

Figure 4A:
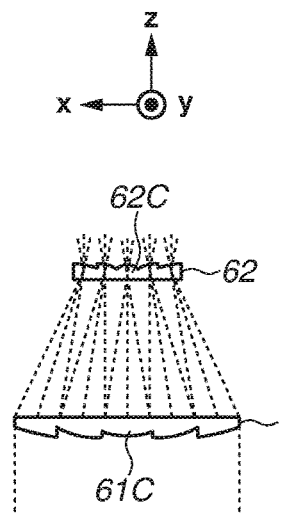
FIGS. 4A, 4B, and 4C each illustrate a fly-eye lens according to the first exemplary embodiment of the present invention.

Various exemplary embodiments, features, and aspects of the invention will be described in detail below with reference to the drawings. It should be noted, however, that the relative arrangement of components, and the like described in the following exemplary embodiments is to be changed as needed according to a configuration of an apparatus to which an exemplary embodiment of the invention is applied and various types of conditions. In other words, the following exemplary embodiments are not intended to limit the scope of the invention, and various modifications and changes can be made without departing from the spirit of the invention.

A first exemplary embodiment will be described with reference to the drawings.

<Configuration of Light Source Optical System and Light Source Apparatus>

FIG. 1 illustrates a configuration of a light source apparatus according to the first exemplary embodiment of the present invention. In FIG. 1, a shorter side direction of a second fly-eye lens 62 is an x-axis direction (first direction), a longer side direction of the second fly-eye lens 62 is a y-axis direction (second direction), and a direction orthogonal to the x-axis and y-axis directions is a z-axis direction.

A light source optical system according to the present exemplary embodiment includes a light guiding optical system including a paraboloid mirror array 3, a flat plane mirror 4, and a concave lens 5. The light source optical system further includes a first fly-eye lens 61 as a first lens surface array, the second fly-eye lens 62 as a second lens surface array, a dichroic mirror 7 as a light guiding element, and a condenser lens unit 8 as a condensing optical system.

The light source apparatus according to the present exemplary embodiment further includes a light source 1, a collimator lens 2, and a fluorescent member 9 in addition to the light source optical system. Fluorescent light reflected by the fluorescent member 9 is collected by the condenser lens unit 8 to convert the fluorescent light into parallel light, and the parallel light is guided to an illumination optical system (not illustrated).

<Optical Path from Light Source 1 to Illumination Optical System>

The light source 1 is a laser diode (LD) that emits blue light. A light flux emitted from the light source 1 is a divergent light flux, and the collimator lens 2 is provided in the direction in which the light flux from the light source 1 travels. The number of collimator lenses 2 is equal to the number of light sources 1. The collimator lens 2 has positive power, so that the divergent light flux from the light source 1 is converted into parallel light flux by the collimator lens 2.

The configuration of the light source 1 will be described in detail with reference to FIGS. 2A to 2C. FIGS. 2A to 2C each schematically illustrate the configuration of a LD used as the light source 1 in the present exemplary embodiment. FIG. 2A illustrates the internal configuration of the LD taken along the x-z cross section as in FIG. 1.

The LD includes an optical semiconductor having a double-hetero structure, inside a package 11 of the LD. The optical semiconductor includes a plurality of clad layers 12 and an active layer 13 sandwiched by the clad layers 12. When an electric field is applied, atoms are activated to cause stimulated emission, and light changed to a resonant state in the active layer 13 is emitted from a cleavage surface on the side that is configured to be a half mirror. A cleavage surface 14 is the cleavage surface on the side from which the light is emitted, and a light power distribution (light emitting surface) 14A of the light source has a shape along the cleavage surface 14.

FIGS. 2B and 2C schematically illustrate the light source 1 along the y-z plane and the x-y plane, respectively. FIGS. 2B and 2C indicate that the light power distribution of the light source has a shape of a strip extending in the y-direction along the cleavage surface 14 as described above.

In the present exemplary embodiment, the light source 1 is placed in such a manner that the longer side direction of the light power distribution of the light source is parallel to the y-axis direction. In this way, the polarization direction of the light flux from the light source 1 is parallel to the y-axis direction, and the direction of the light flux is the direction of S-polarized light with respect to a reflecting surface such as the paraboloid mirror array 3 and the flat plane mirror 4. In general, the reflectance of S-polarized light is higher than the reflectance of P-polarized light, so that in a system in which reflection is repeated on a cross section as in the light source optical system according to the present exemplary embodiment, the light power distribution of the light source 1 is desirably parallel to the y-axis direction.

In other words, when a plane that is parallel to the optical axis of the collimator lens 2 as a positive lens and the normal line of a reflecting surface configured to reflect light flux from the collimator lens 2 is defined as a reference plane, the radiation angle of the light source 1 is smaller at the reference plane than at a plane that includes the optical axis of the collimator lens 2 and is orthogonal to the reference plane. As used herein, the radiation angle refers to a divergence angle at which the intensity is 50% of the maximum intensity of the intensity distribution of light flux from the light source 1.

The plurality of light fluxes having exited the light sources 1 pass through the collimator lenses 2 travels in the z-axis direction to the paraboloid mirror array 3, and then travels toward the flat plane mirror 4 while the distances between the plurality of light fluxes are decreased by the paraboloid mirror array 3. The light fluxes reflected by the flat plane mirror 4 enter the concave lens 5. The concave lens 5 shares its focal position with the focal point of the paraboloid mirror array 3 and thus output the light fluxes in the form of parallel light fluxes.

The parallel light fluxes having exited through the concave lens 5 enter the first fly-eye lens 61 and are divided into a plurality of light fluxes. The divided light fluxes having passed through the second fly-eye lens 62 are reflected by the dichroic mirror 7 and travel toward the condenser lens unit 8. The size of the dichroic mirror 7 is the minimum size required for reflecting light fluxes from the second fly-eye lens 62, and the surface of the dichroic mirror 7 is coated with a dielectric multilayer film (dichroic film) having characteristics that reflects blue light from the light source 1 and transmits a wavelength of fluorescent light that will be described below.

The divided light fluxes reflected by the dichroic mirror 7 are condensed and overlapped on the fluorescent member 9 by the condenser lens unit 8 having positive power. Consequently, a condensed light spot is formed on the fluorescent member 9. The condensed light spot formed on the fluorescent member 9 is conjugate with each lens cell of the first fly-eye lens 61 and thus has a rectangular and uniform distribution.

While some of the light fluxes having entered the fluorescent member 9 are converted into fluorescent light mainly having red and green spectra and are reflected, some of the other light fluxes are reflected as blue light without being converted. In other words, the fluorescent member 9 is a wavelength converting element configured to convert wavelengths of some of the light fluxes from the light sources 1. The reflected white light flux formed by three primary colors of red, green, and blue is converted into parallel light again by the condenser lens unit 8 and travels toward the illumination optical system.

The foregoing configuration and optical path make it possible to guide white light flux to the illumination optical system.

<Cause of Decrease in Light Use Efficiency>

As described above, the parallel light flux from the concave lens 5 is divided into a plurality of light fluxes by a plurality of first lens cells (first lens surface) 61A of the first fly-eye lens 61. Then, each of the plurality of light fluxes is guided to a corresponding lens cell 62A of a plurality of second lens cells (second lens surface) 62A of the second fly-eye lens 62. Consequently, a light source image 14' of the light source is formed on the corresponding lens cell 62A of the second fly-eye lens 62. More specifically, the light source image 14' is formed inside the second lens cell 62A when viewed in the direction of the optical axis of the second lens cell 62A. Further, the width of the light source image 14' in the first direction is smaller than the width of the second lens cell 62A in the first direction, and the width of the light source image 14' in the second direction is smaller than the width of the second lens cell 62A in the second direction.

In a case where the light source image 14' enters a lens cell that is different from the corresponding lens cell, the size of the condensed light spot formed on the fluorescent member 9 increases by the amount of light flux having entered the lens cell that is different from the corresponding lens cell. For third and fourth fly-eye lenses 18a and 18b in an illumination optical system 200 described below, an increase in the condensed light spot on the fluorescent member 9 is equivalent to an increase in size of a light emitting point of the light source.

The light flux having increased the condensed light spot on the fluorescent member 9 may extend from a corresponding lens cell among a plurality of lens cells of the fourth fly-eye lens 18b and enter a lens cell that is different from the corresponding lens cell. Consequently, part of the light fluxes from the fourth fly-eye lens 18b may be eclipsed by a subsequent optical element or guided to the outside of a liquid crystal panel 25 described below. Thus, the light fluxes that are not used effectively increase to decrease the light use efficiency.

<Relationship Between Light Source Image and Second Lens Cell>

In view of the foregoing, in an exemplary embodiment of the present invention, the second lens cell 62A is shaped in such a manner that the longer side direction of the second lens cell 62A coincides with the longer side direction of the light source image 14'. In other words, when the shorter side direction of the second lens cell 62A is defined as a first direction and the longer side direction of the second lens cell 62A as a second direction, the width of the light source image 14' in the second direction that is formed between the first fly-eye lens 61 and the fluorescent member 9 by the first lens cell 61A is larger than the width of the light source image 14' in the first direction.

More specifically, as illustrated in FIG. 3B, the longer side direction of the second lens cell 62A is the y-axis direction, and the longer side direction of the light source image 14' is also the y-axis direction. This configuration makes it possible to prevent a decrease in light use efficiency described above. Further, the second lens cell 62A may be formed in the shape of a square with a sufficiently large size with respect to the light source image 14' as illustrated in FIG. 3A, whereby an increase in size of the second fly-eye lens 62 can be prevented.

<Configuration of First and Second Fly-Eye Lenses 61 and 62>

The detailed configurations of the first and second fly-eye lenses 61 and 62 according to the present exemplary embodiment will be described with reference to FIGS. 4A to 4C.

Figure 4B:
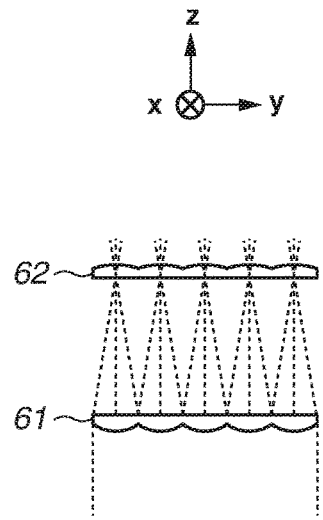
Figure 4C:
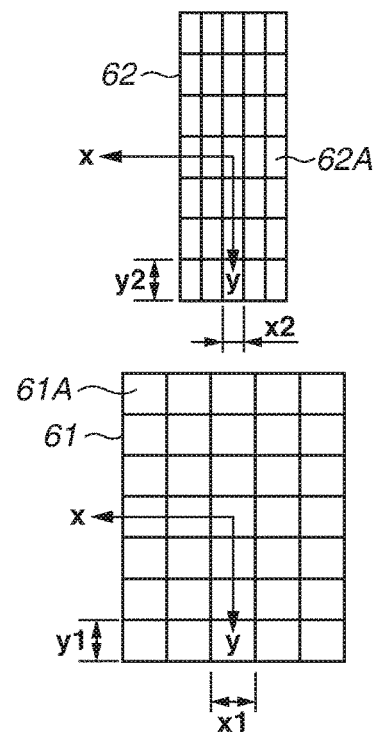

FIGS. 4A to 4C are enlarged views each illustrating the first and the second fly-eye lenses 61 and 62 according to the present exemplary embodiment. FIG. 4A illustrates the x-z cross section as in FIG. 1, and FIGS. 4B and 4C illustrate the y-z and the x-y cross section, respectively.

In the present exemplary embodiment, the light flux is compressed in the x-axis direction but is not compressed in the y-axis direction, as illustrated in FIGS. 4A, 4B, and 4C. In other words, the width of the second fly-eye lens 62 in the first direction is narrower than the width of the first fly-eye lens 61 in the first direction. Further, the width of the second fly-eye lens 62 in the second direction is equal to the width of the first fly-eye lens 61 in the second direction.

The above-described configuration is employed for the following reason. As described above, the dichroic mirror 7 has characteristics of reflecting blue light included in the light source 1 to guide the blue light to the fluorescent member 9, and the fluorescent member 9 converts a part of the blue light in the light source 1 via the dichroic mirror 7 into fluorescent light including green light and red light and emits the fluorescent light and non-converted light. The non-converted light having entered the dichroic mirror 7 is not guided to the subsequent stage illumination optical system but returns toward the light source 1. In other words, the larger the dichroic mirror 7 is, the lower the light use efficiency becomes.

Therefore, in the present exemplary embodiment, the light flux is compressed in the x-direction as described above so that the width of the second fly-eye lens 62 in the first direction is narrower than the width of the first fly-eye lens 61 in the first direction. In this way, the width of the dichroic mirror 7 can be reduced to match the width of the second fly-eye lens 62 compared to a case where the light flux is not compressed in the x-direction.

Thus, the width of the dichroic mirror 7 in the x-axis direction is substantially equal to the width of the second fly-eye lens 62 in the x-axis direction. In other words, in a direction orthogonal to the optical axis of the second fly-eye lens 62 in a surface (first cross section) that is parallel to the normal line of the dichroic mirror 7 and the optical axis of the condenser lens unit 8, the width Wd of the dichroic mirror 7 and the width Wf2 of the second fly-eye lens 62 at least satisfy $0.8<Wd/Wf2<1.2$, more desirably $0.9<Wd/Wf2<1.1$. Further, on the first cross section, the width Wf2 of the second fly-eye lens 62 in the first direction is narrower than the width Wf1 of the first fly-eye lens 61 in the first direction.

As described above, the light flux is compressed in the first cross section so that the width of the dichroic mirror 7 in the x-axis direction in the first cross section can be reduced, whereby the size of the light source optical system can be decreased while a decrease in light use efficiency is prevented. If the width of the dichroic mirror 7 in the y-axis direction on a plane (y-z cross section) orthogonal to the optical axis of the condenser lens unit 8 is decreased, it is possible to prevent a decrease in light use efficiency due to an increase in the amount of non-converted light from the fluorescent member 9 that is guided to the illumination optical system.

However, in this case, it is not possible to shorten the distance between the dichroic mirror 7 and the condenser lens unit 8. Further, although the width of the dichroic mirror 7 in the y-axis direction can be decreased, since the diameter of the condenser lens unit 8 remains the same, it is not possible to sufficiently decrease the size of the light source optical system. Accordingly, it is desirable to decrease the width of the dichroic mirror 7 in the x-axis direction as described in FIG. 1 as described above.

The width Wd of the dichroic mirror 7 described above can also be defined as follows. Specifically, in a case where the dichroic mirror 7 includes a transparent substrate and a dichroic film with which a part of the transparent substrate is coated, the width of the region coated with the dichroic film may be defined as the width Wd.

Further, the compression of light fluxes in the present exemplary embodiment is realized by decentering a part of the plurality of first lens cells and a part of the plurality of second lens cells, as illustrated in FIG. 4A. More specifically, lens cells other than a plurality of lens cells of the same position in the y-axis direction as lens cells 61C and 62C respectively located at centers of the fly-eye lenses 61 and 62 and a plurality of lens cells of the same position in the x-axis direction as the lens cells 61C and 62C are decentered when viewed in the z-axis direction in FIG. 4A. As used herein, the term "decentering" means that the optical axis of a lens cell is decentered from the center of gravity of the lens cell itself when viewed in the direction of the optical axis of the lens cell.

In the case where the light flux is compressed by decentering, the size of a light source image formed on the second fly-eye lens 62 does not increase. However, when the decentering amount is excessively large, the gradient of the lens surface becomes steep if the lens is a spherical lens, and in some cases the lens shape cannot be maintained or the shaping becomes difficult. In such cases, the degree of gradient can be decreased by changing the radius of curvature for each lens cell. The change to the radius of curvature does not necessarily have to be rotationally symmetric. In other words, the radius of curvature of only a cross section having a large decentering amount may be decreased, and the shape of a so-called toric surface (toric lens) may be employed.

As described above, the shapes of the first and second lens cells 61A and 62A can be changed as appropriate. The radius of curvature of at least one of the first and second lens cells 61A and 62A may be set different from the radii of curvature of the rest of the lens cells, and at least one of the lens cells may be a toric lens as described above.

Further, the light flux compression rate desirably satisfies conditions described below.

The width of the first lens cell 61A in the x-axis direction (first direction) in FIG. 4C will be referred to as "width x1", and the width of the first lens cell 61A in the y-axis direction (second direction) as "width y1". Further, the width of the second lens cell 62A in the x-axis direction will be referred to as "width x2", and the width of the second lens cell 62A in the y-axis direction as "width y2".

The light source optical system desirably satisfies at least $$0.2 < x2/x1 < 0.8,$$

more desirably $$0.3 < x2/x1 < 0.7,$$

yet more desirably $$0.4 < x2/x1 < 0.6.$$

A lowering beyond a lower limit specified in the foregoing conditional formulas is undesirable because the compression rate becomes excessively high to increase the decentering amount of the first lens cell 61A, which leads to an increase in aberration. Further, a rising beyond an upper limit is also undesirable because the compression rate becomes excessively low and the size of the dichroic mirror 7 cannot be sufficiently decreased, which makes it difficult to sufficiently prevent a decrease in light use efficiency described above.

When the compression rate in the y-axis direction is also taken into consideration, a desirable range of compression rate can also be expressed as follows. Specifically, the light source optical system desirably satisfies at least $$0.1 < (x2/y2)/(x1/y1) < 0.8,$$

more desirably $$0.2 < (x2/y2)/(x1/y1) < 0.7,$$

yet more desirably $$0.3 \leq (x2/y2)/(x1/y1) \leq 0.6.$$

In the present exemplary embodiment, x2/x1=0.5, and y2/y1=1.0, so that (x2/y2)/(x1/y1)=0.5.

Figure 5A:
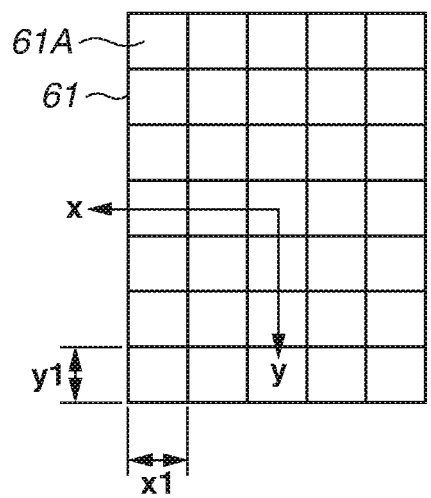
FIGS. 5A and 5B each illustrates a fly-eye lens according to a second exemplary embodiment of the present invention.
Figure 5B:
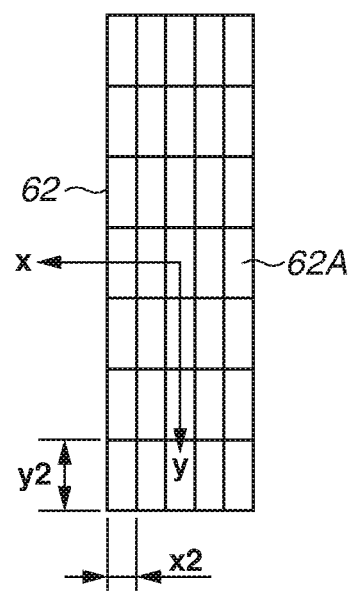

FIGS. 5A and 5B respectively illustrate the shapes of x-y cross section of first and second fly-eye lenses 61 and 62 in a light source optical system according to a second exemplary embodiment of the present invention. The configurations of components other than the first and second fly-eye lenses 61 and 62 are similar to the configurations in the first exemplary embodiment, so that description thereof is omitted.

While the present exemplary embodiment is similar to the first exemplary embodiment in that the first fly-eye lens 61 compresses the light fluxes in the x-direction, the present exemplary embodiment is different from the first exemplary embodiment in that the width of each light flux is enlarged in the y-direction. In other words, the width of the second fly-eye lens 62 in the second direction is larger than the width of the first fly-eye lens 61 in the second direction. As a result, the relationship between a second lens cell 62A and a light source image 14' is as illustrated in FIG. 6.

Figure 6:
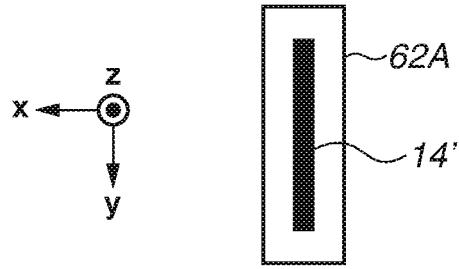
FIG. 6 illustrates a relationship between a second fly-eye lens and a light source image.

Since the width of the light flux in the y-direction is enlarged in the present exemplary embodiment as illustrated in FIG. 6, a decrease in light use efficiency due to LD variations can further be prevented in the y-direction compared to the first exemplary embodiment.

Further, the width of the light flux in the x-direction is more compressed than in the first exemplary embodiment so that the aspect ratio of the light source image 14' is substantially equal to the aspect ratio of the second lens cell 62A. In this way, even if the position of the light source image 14' is moved due to LD variations, sensitivity characteristics in the x- and y-directions are equal. Further, the area of the entire second fly-eye lens 62 is equal to that in the first exemplary embodiment, so that an increase in size is prevented.

In the present exemplary embodiment, $$(x2/y2)/(x1/y1)=0.3.$$

Figure 7A:
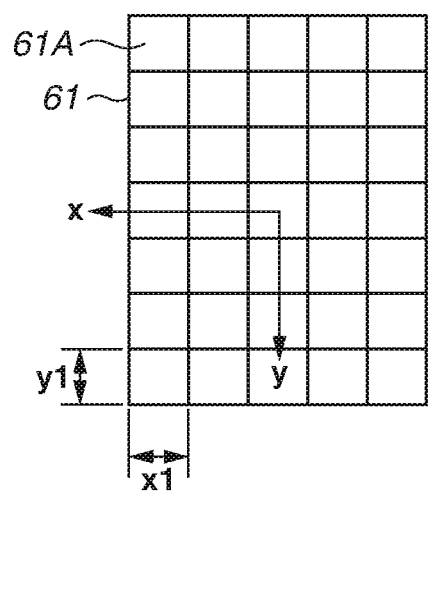
FIGS. 7A and 7B each illustrate a fly-eye lens according to a third exemplary embodiment of the present invention.
Figure 7B:
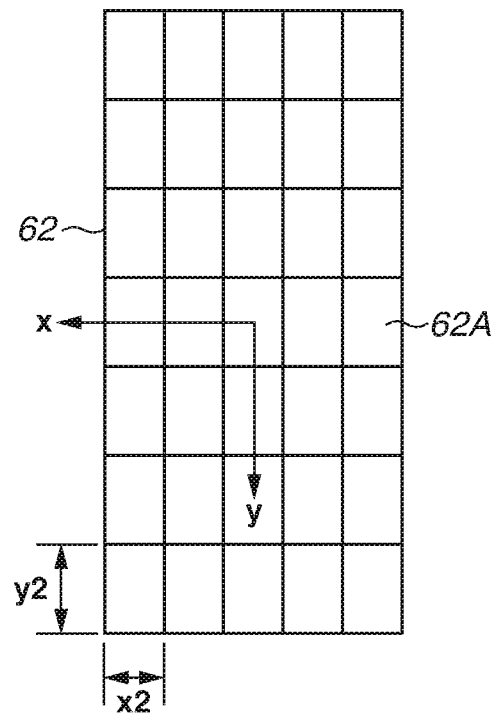

FIGS. 7A and 7B respectively illustrate shapes of x-y cross sections of the first and second fly-eye lenses 61 and 62 in an light source optical system according to a third exemplary embodiment of the present invention. The configurations of components other than the first and second fly-eye lenses 61 and 62 are similar to the configurations in the first exemplary embodiment, so description thereof is omitted.

The present exemplary embodiment is different from the first exemplary embodiment in that the first fly-eye lens 61 does not compress the light fluxes in the x-direction but, instead, enlarges the width of each light flux in the y-direction. Consequently, the relationship between a second lens cell 62A and a light source image 14' is as illustrated in FIG. 8.

Figure 8:
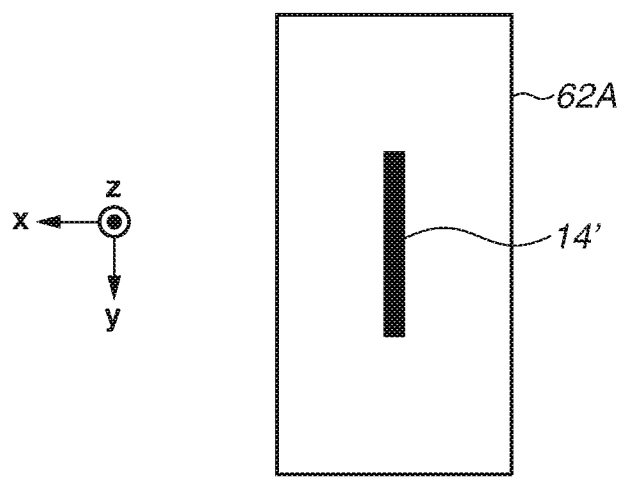
FIG. 8 illustrates a relationship between a second fly-eye lens and a light source image according to the third exemplary embodiment of the present invention.

As illustrated in FIG. 8, although the size of the entire second fly-eye lens 62 is increased, the amount of margin with respect to the light source image 14' is increased, compared to the first exemplary embodiment. Thus, a decrease in light use efficiency due to LD variations can further be prevented in the present exemplary embodiment than in the first exemplary embodiment. This makes it unnecessary to increase the size of a subsequent optical element in order to prevent light from being eclipsed by a subsequent optical system, whereby an increase in size of the optical system can be prevented.

In the present exemplary embodiment, $$(x2/y2)/(x1/y1)=0.5.$$

Figure 9:
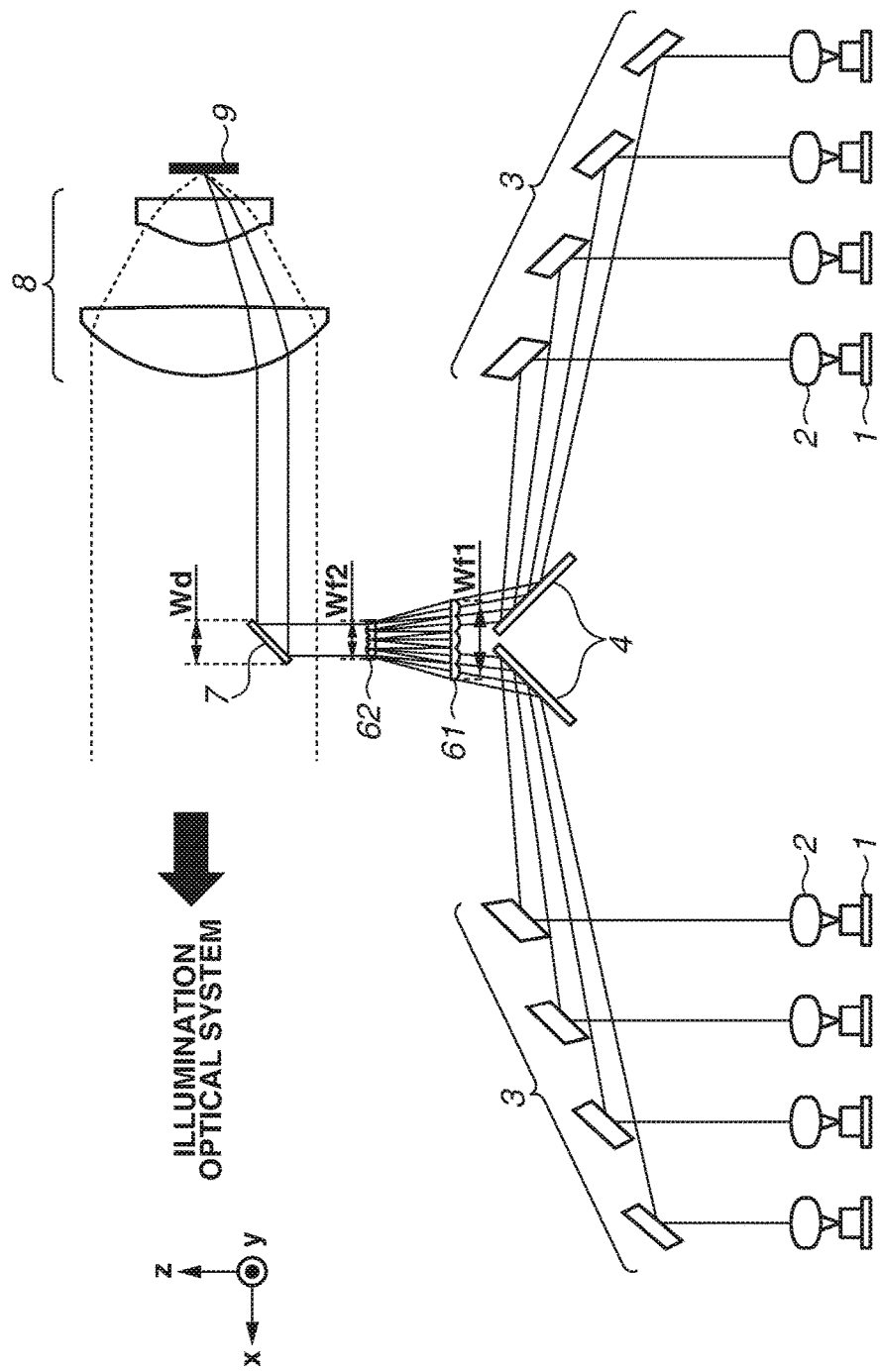
FIG. 9 illustrates a configuration of a light source apparatus according to a fourth exemplary embodiment of the present invention.

FIG. 9 illustrates a configuration of a light source optical system according to a fourth exemplary embodiment of the present invention.

The present exemplary embodiment is different from the first exemplary embodiment in that no concave lens 5 is included and not parallel light fluxes but convergent light fluxes enter a first fly-eye lens 61.

The present exemplary embodiment is similar to the first exemplary embodiment in that the first fly-eye lens 61 guides the light fluxes to a second fly-eye lens 62 while compressing the light fluxes in the x-direction. However, in the present exemplary embodiment, convergent light fluxes enter the first fly-eye lens 61. This makes it possible to decrease the decentering amount of each lens cell of the first fly-eye lens 61 compared to the case where parallel light fluxes enter the first fly-eye lens 61, making it easier to shape the lens.

More specifically, the decentering amount of a predetermined lens cell among a plurality of first lens cells 61A is smaller than the decentering amount of the predetermined lens cell among a plurality of second lens cells 62A. As used herein, the term "decentering amount" refers to the distance between the center of gravity of a lens cell and the optical axis of the lens cell when viewed in the direction of the optical axis of the lens cell.

Furthermore, since the concave lens 5 is not necessary, a smaller light source optical system and a smaller light source apparatus can be realized.

Figure 10:
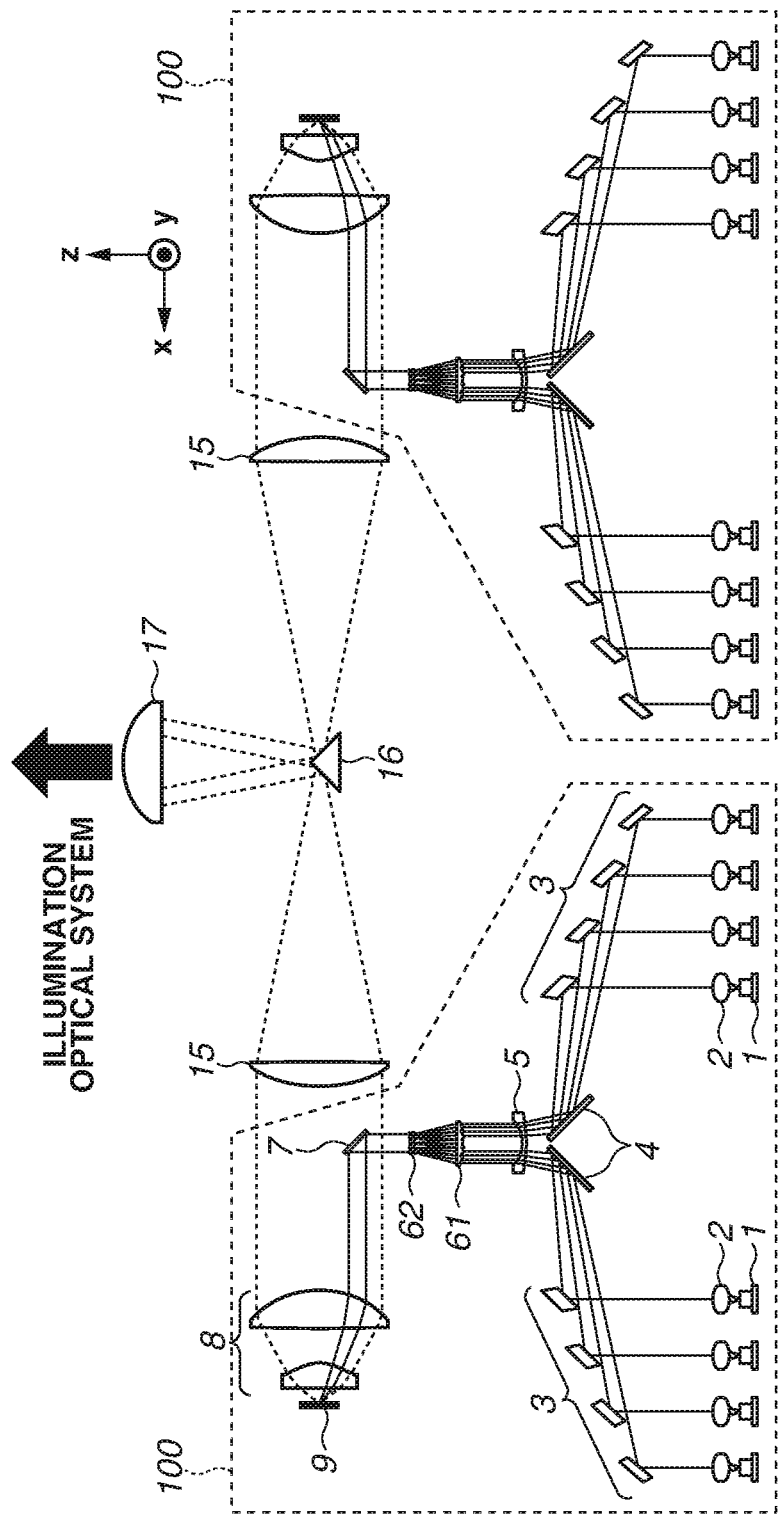
FIG. 10 illustrates a configuration of a light source apparatus according to a fifth exemplary embodiment of the present invention.

FIG. 10 schematically illustrates a light source optical system and a light source apparatus according to a fifth exemplary embodiment of the present invention.

This configuration is an example in which two light source apparatuses 100 described above in the first exemplary embodiment are used to increase the luminance, and light fluxes from a light source apparatus 13 are combined by a combining optical system including a plurality of lenses 15, a combining prism 16, and a lens 17 and then guided to an illumination optical system (not illustrated).

In the present exemplary embodiment, the first fly-eye lens 61 is configured to compress the light fluxes in the x-axis direction, whereby an increase in size in the x-axis direction that occurs when a plurality of light source apparatuses 100 is arranged can be prevented. In other words, in the plane that is parallel to the normal line of a dichroic mirror 7 and the optical axis of a condenser lens unit 8, the width of a second fly-eye lens 62 in the x-axis direction is smaller than the width of the first fly-eye lens 61 in the x-axis direction.

Figure 11:
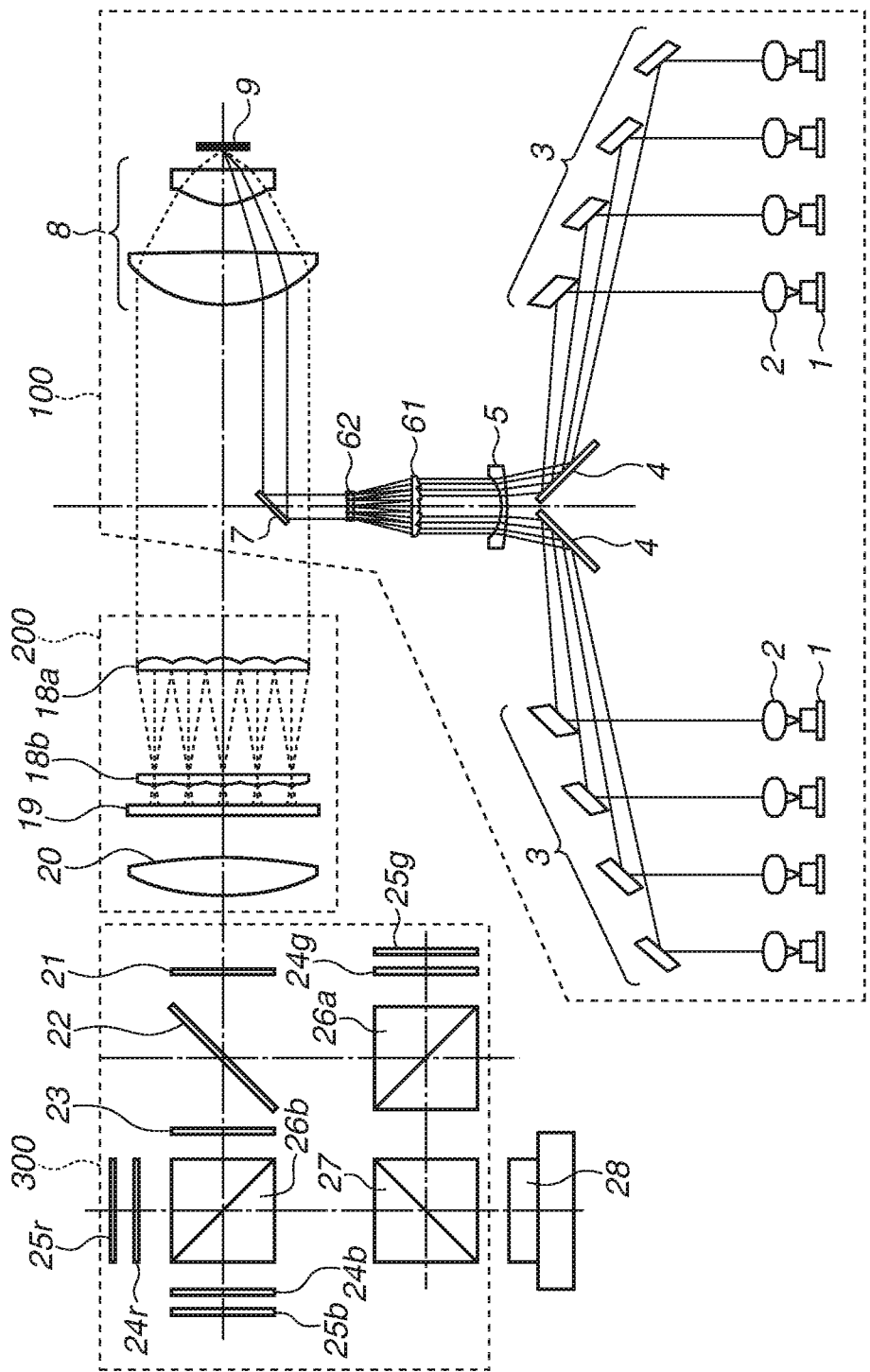
FIG. 11 illustrates a configuration of a projector on which a light source apparatus according to an exemplary embodiment of the present invention can be mounted.

FIG. 11 illustrates a configuration of a projector (projection type display apparatus) including a light source optical system and a light source apparatus according to the exemplary embodiments described above.

A light source apparatus 100 is the light source apparatus 100 described above in the first exemplary embodiment. It is certainly possible to use a light source apparatus described above in the exemplary embodiments other than the first exemplary embodiment.

An illumination optical system 200 illuminates a liquid crystal panel 25 (light modulating element), which will be described below, with light fluxes from the light source apparatus 100. The illumination optical system 200 includes a third fly-eye lens 18a, a fourth fly-eye lens 18b, a polarization conversion element 19, and a condenser lens 20.

The light flux from the light source apparatus 100 is divided into a plurality of light fluxes by the third fly-eye lens 18a to form a light source image between the fourth fly-eye lens 18b and the polarization conversion element 19.

The polarization conversion element 19 is configured to align the polarization direction of incident light fluxes in a predetermined direction, and the light fluxes from the polarization conversion element 19 are guided to a color separating/combining unit 300 by the condenser lens 20.

The color separating/combining unit 300 includes a polarizing plate 21, a dichroic mirror 22, a wavelength selective phase plate 23, a liquid crystal panel 25r for red, a liquid crystal panel 25g for green, and a liquid crystal panel 25b for blue. The liquid crystal panels 25r, 25g, and 25b will collectively be referred to as a liquid crystal panel 25. The color separating/combining unit 300 further includes a λ/4 plate 24r for red, a λ/4 plate 24g for green, a λ/4 plate 24b for blue, a first polarization beam splitter 26a, a second polarization beam splitter 26b, and a combining prism 27. The λ/4 plates 24r, 24g, and 24b will collectively be referred to as a λ/4 plate 24. Further, a part of the color separating/combining unit 300 excluding the liquid crystal panel 25 will be referred to as a color separating/combining system.

The polarizing plate 21 is a polarizing plate configured to transmit only the light in the polarization direction aligned by the polarization conversion element 19, and blue light and red light among the light from the polarizing plate 21 are guided to the second polarization beam splitter 26b by the dichroic mirror 22. On the other hand, green light is guided to the first polarization beam splitter 26a.

The first and the second polarization beam splitters 26a and 26b are configured to guide the light from the dichroic mirror 22 to the liquid crystal panel 25 according to the polarization direction and are also configured to guide the light from the liquid crystal panel 25 to the combining prism 27. Further, the λ/4 plate 24 generates a phase difference of λ/2 in the reciprocation by the reflection by the liquid crystal panel 25 to increase the light detection effect.

The combining prism 27 combines the blue light and the red light from the second polarization beam splitter 26a with the green light from the second polarization beam splitter 26b and guides the combined light to a projection optical system 28.

The foregoing configuration enables the projector illustrated in FIG. 11 to project a color image onto a projection target surface such as a screen.

In the position where the light source apparatus 100 is provided in FIG. 11, a plurality of the light source apparatuses 100 illustrated in FIG. 10 may be provided in place of the light source apparatus 100. In this case, parallel light flux from the lens 17 in FIG. 10 only needs to be caused to enter the illumination optical system 200.

While various exemplary embodiments of the present invention have been described above, it is apparent that the disclosed exemplary embodiments are not intended to limit the scope of the invention, and various modifications and changes can be made within the spirit of the invention.

Other Exemplary Embodiment

In the exemplary embodiments described above, the first and the second fly-eye lenses 61 and 62 are separate optical elements. In other words, the light source optical system includes the first fly-eye lens 61 as the first lens array including the first lens surface array and the second fly-eye lens 62 as the second lens array including the second lens surface array, in this order from the light source 1 side.

Figure 12A:
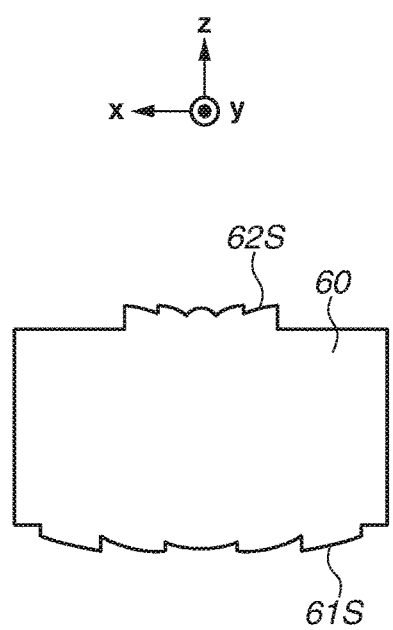
FIGS. 12A and 12B each illustrate a modification example of a fly-eye lens used in an exemplary embodiment of the present invention.
Figure 12B:
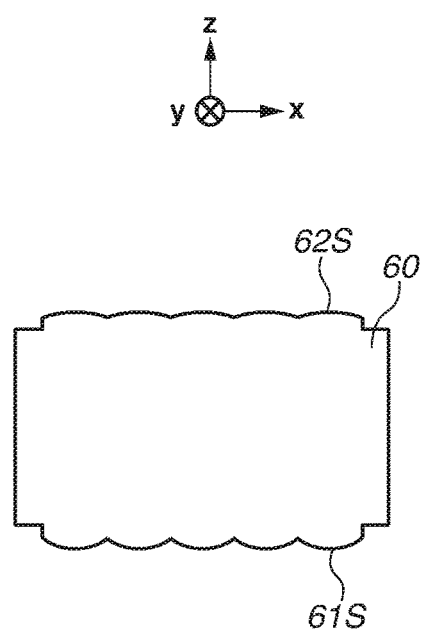

However, the exemplary embodiments of the present invention are not limited to the configuration described above, and the first and the second fly-eye lenses may be formed on respective surfaces of a single element as illustrated in FIG. 12. In other words, a microlens array 60 including a first lens surface array 61S, which is the surface on the light source 1 side, and a second lens surface array 62S, which is the surface on the fluorescent member 9 side, may be provided between the light source 1 and the fluorescent member 9. The integrated structure as illustrated in FIG. 12 is desirable because a relative misalignment of lens cells arranged on opposite sides of the microlens array 60 can be minimized.

Further, while details are not described in the above exemplary embodiments, the light source 1 and the collimator lens 2 may be held by either separate holding members or the same holding member. For example, an LD bank in which eight light sources 1 and eight collimator lenses 2 are integrated may be used.

Further, the light fluxes from the paraboloid mirror array 3 may be guided to the concave lens 5 using a prism in place of the flat plane mirror 4 described in the above exemplary embodiments.

Further, while the configuration in which the first fly-eye lens 61 forms a light source image on the second fly-eye lens 62 is described as an example in the above exemplary embodiments, the light source image may be just required to be formed in the neighborhood of the second fly-eye lens 62. In other words, the light source image may be just required to be formed between the second fly-eye lens 62 and the fluorescent member 9 or between the second fly-eye lens 62 and the dichroic mirror 7.

The width of the light source image in the exemplary embodiments described above may be defined as follows. Specifically, the width of a region up to a predetermined proportion of the maximum intensity in the intensity distribution in a region where a light source image is formed may be defined as the width of the light source. For example, the full width at half maximum in the intensity distribution described above may be defined as the width of the light source image. The foregoing definition may be applied to both the width of the light source image in the long side direction and the width of the light source image in the short side direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-241386, filed Dec. 10, 2015, and No. 2016-216118, filed Nov. 4, 2016, which are hereby incorporated by reference herein in their entirety.

What is claimed is:

1. A light source optical system configured to guide a light flux from a light source to a wavelength converting element, the light source optical system comprising:
   a first lens surface array including a plurality of first lens surfaces; and
   a second lens surface array including a plurality of second lens surfaces and configured to guide light fluxes from the first lens surface array to the wavelength converting element,
   wherein a light source image is formed between the first lens surface array and the wavelength converting element by the light flux transmitted through the plurality of first lens surfaces, and
   wherein, when a short side direction of the plurality of second lens surfaces is defined as a first direction and a long side direction of the plurality of second lens surfaces is defined as a second direction, a width of the light source image in the second direction is wider than a width of the light source image in the first direction.

2. The light source optical system according to claim 1, wherein, when viewed in a direction of an optical axis of a second lens surface of the plurality of the second lens surfaces, the light source image is formed inside the second lens surface, and the width of the light source image in the first direction is narrower than a width of the second lens surface in the first direction, and the width of the light source image in the second direction is narrower than a width of the second lens surface in the second direction.

3. The light source optical system according to claim 1, wherein a width of the second lens surface array in the first direction is narrower than a width of the first lens surface array in the first direction.

4. The light source optical system according to claim 3, wherein $0.2 < x2/x1 < 0.8$ is satisfied, where $x1$ is a width of a first lens surface of the plurality of first lens surfaces in the first direction and $x2$ is a width of a second lens surface of the plurality of second lens surfaces in the first direction.

5. The light source optical system according to claim 1, wherein a width of the second lens surface array in the second direction is wider than a width of the first lens surface array in the second direction.

6. The light source optical system according to claim 1, wherein $0.1 < (x2/y2)/(x1/y1) < 0.8$ is satisfied, where $x1$ is a width of a first lens surface of the plurality of first lens surfaces in the first direction, $y1$ is a width of the first lens surface in the second direction, $x2$ is a width of a second lens surface of the plurality of second lens surfaces in the first direction, and $y2$ is a width of the second lens surface in the second direction.

7. The light source optical system according to claim 1, wherein an optical axis of at least one of the plurality of first lens surfaces is decentered from a center of gravity of the one of the plurality of first lens surfaces.

8. The light source optical system according to claim 7, wherein a light flux from the light source that enters the first lens surface array is a convergent light flux, and a decentering amount of a predetermined lens surface of the plurality of first lens surfaces is smaller than a decentering amount of a lens surface of the plurality of second lens surfaces which corresponds to the predetermined lens surface.

9. The light source optical system according to claim 1, wherein an optical axis of at least one of the plurality of second lens surfaces is decentered from a center of gravity of the one of the plurality of second lens surfaces.

10. The light source optical system according to claim 1, wherein at least one of the plurality of first lens surfaces and the plurality of second lens surfaces is a toric lens.

11. The light source optical system according to claim 1, wherein the light source optical system includes between the light source and the wavelength converting element a lens array including the first lens surface array as the light source side surface and the second lens surface array as the wavelength converting element side surface.

12. The light source optical system according to claim 1, further comprising:
   a first lens array including the first lens surface array; and
   a second lens array including the second lens surface array, the first lens array and the second lens array provided in this order from the light source side.

13. The light source optical system according to claim 1, further comprising:
- a light guiding element configured to guide a light flux from the second lens surface array in a direction of the wavelength converting element and also configured to guide a light flux from the wavelength converting element in a direction different from a direction of the light source; and
- a condensing optical system configured to guide a light flux from the light guiding element to the wavelength converting element and having positive power,
- wherein, when a plane parallel to a normal line of the light guiding element and an optical axis of the condensing optical system is defined as a first cross section, in the first cross section, a width of the second lens surface array in the first direction is narrower than a width of the first lens surface array in the first direction.

14. The light source optical system according to claim 13, wherein on the first cross section, a width of the light guiding element in a direction orthogonal to the optical axis of the condensing optical system is narrower than a diameter of the condensing optical system.

15. A projection display apparatus comprising:
- a light source;
- a positive lens provided in a direction in which a light flux from the light source travels;
- a wavelength converting element;
- a light source optical system configured to guide a light flux from the light source to the wavelength converting element;
- a light modulating element;
- an illumination optical system configured to illuminate the light modulating element with a light flux from the light source optical system; and
- a color separating/combining system configured to guide the light flux from the light source optical system to the light modulating element and also configured to guide a light flux from the light modulating element to a projection optical system,
- wherein the light source optical system comprises
- a first lens surface array including a plurality of first lens surfaces; and
- a second lens surface array including a plurality of second lens surfaces and configured to guide a light flux from the first lens surface array to the wavelength converting element,
- wherein a light source image is formed between the first lens surface array and the wavelength converting element by the light flux transmitted through the plurality of first lens surfaces, and
- wherein, when a shorter side direction of the plurality of second lens surfaces is defined as a first direction and a longer side direction of the plurality of second lens surfaces as a second direction, a width of the light source image in the second direction is wider than a width of the light source image in the first direction.

16. A projection display apparatus comprising:
- a plurality of light source apparatuses,
- wherein each of the plurality of light source apparatuses comprises:
- a light source;
- a positive lens provided in a direction in which a light flux from the light source travels;
- a wavelength converting element configured to convert a light flux from the light source into converted light having a wavelength different from the light flux from the light source and also configured to guide the converted light in a direction different from a direction of the light source;
- a first lens surface array including a plurality of first lens surfaces and configured to divide a light flux from the positive lens into a plurality of light fluxes;
- a second lens surface array including a plurality of second lens surfaces and configured to guide a light flux from the first lens surface array to the wavelength converting element;
- a light guiding element configured to guide a light flux from the second lens surface array in a direction of the wavelength converting element and also configured to guide a light flux from the wavelength converting element in a direction different from a direction of the light source; and
- a condensing optical system configured to guide a light flux from the second lens surface array to the wavelength converting element,
- wherein a light source image is formed between the first lens surface array and the wavelength converting element by the light flux transmitted through the plurality of first lens surfaces, and
- wherein, when a short side direction of the plurality of second lens surfaces is defined as a first direction and a long side direction of the plurality of second lens surfaces as a second direction, a width of the light source image in the second direction is wider than a width of the light source image in the first direction, and
- in a plane parallel to a normal line of the light guiding element and an optical axis of the condensing optical system, a width of the second lens surface array in the first direction is narrower than a width of the first lens surface array in the first direction.

* * * * *